Patented Mar. 15, 1960

2,928,809

EPOXIDE RESIN-QUATERNARY AMMONIUM SALT COMPOSITIONS

Darrell D. Hicks, Louisville, Ky., assignor to Devoe & Reynolds Company, Inc., a corporation of New York No Drawing. Application August 12, 1957
Serial No. 677,776

10 Claims. (Cl. 260—47)

This invention relates to a process for the curing of polyepoxides. In one of its aspects the invention relates to the curing of polyepoxides with a novel class of curing agents. In another aspect the invention pertains to the use of these curing agents as accelerators for known curing agents. In still another of its aspects the invention relates to the preparation of films and to such useful products as encapsulating materials, laminates, pottings, castings and the like from epoxide resins.

In the preparation of cured compositions from polyepoxides a variety of converters are employed. However, many such converters begin to react with the epoxide immediately upon admixture therewith, rendering the handling of these materials and processes involving their use difficult. Organic polybasic acid anhydrides are used quite widely but they are characterized by low exotherm values. This means that polyepoxide-anhydride compositions must be cured for long periods of time and there is a risk of vaporization and loss of curing agent. As a result, anhydrides are not desirable in film-forming compositions. In order to use anhydrides found in the literature and patent art, the mixture of anhydride and epoxide must be heated since most anhydrides and epoxide resins are incompatible at room temperatures. Anhydrides thus are not completely effective. Amines are frequently employed in the curing of epoxide resins but results vary depending upon the particular amine, and many amines are not suitable over a wide range of curing conditions. Curing periods with many amines are longer than desirable. With other amines, amine-epoxide resin mixtures are not stable at room temperatures. Phenols are not used extensively in the curing of epoxide resins because quite high temperatures are necessary in order to obtain effective cures.

In accordance with an embodiment of this invention, converters are provided which in combination with epoxide resins form mixtures which are more stable than amines at room temperatures. In contrast with anhydrides, these converters can be mixed with polyepoxides without the application of heat and they can be used in the formation of films as well as castings. In another embodiment, faster curing times are produced using organic polybasic acid anhydrides as curing agents with epoxide resins through the use of converters of this invention as accelerators. The invention also contemplates the use effectively of converters of the invention as accelerators in phenol-epoxide and amine-epoxide reactions.

The compositions contemplated by this invention include an epoxide resin having a 1,2-epoxy equivalency greater than one and from 0.1 to 10 percent of a quaternary ammonium salt of an organic acid. Preferred organic acids are those having a pK value of 1 to 5, such as acetic acid, oxalic acid, maleic acid, formic acid, fumaric acid, benzoic acid, and gallic acid. Quaternary ammonium salts within the contemplation of this invention are tetraalkyl, aryl trialkyl and alkaryl trialkyl ammonium salts of acids having pK values of 1 to 5, wherein the aryl, alkaryl and alkyl substituents each have no more than eight carbon atoms. In connection with aliphatic acids, as a practical matter, it is normally desirable to form quaternary ammonium salts of such fatty acids of less than about twenty carbon atoms. Organic acids, the quaternary ammonium salts of which are included, are 2-ethyl hexoic, butyric, lauric, oleic, caprylic, cinnamic, adipic, capric, myristic, tartaric, palmitic, stearic, nondecylic, toluylic, etc. Quaternary ammonium salts of organic acids are best prepared by neutralizing quaternary ammonium hydroxide with the particular acid. Examples of quaternary ammonium salts are benzyltrimethyl ammonium acetate, benzyltriethyl ammonium formate, di-(phenyltrimethyl)-ammonium maleate, di-(tolyl trimethyl ammonium)-fumarate, benzyltrimethyl ammonium ethyl hexoate, di-(benzyltrimethyl ammonium)-oxalate, di-(benzyltrimethyl ammonium)-tartarate, benzyltrimethyl ammonium lactate, ethylene bis(trimethyl ammonium acetate), octyl trimethyl ammonium benzoate, benzyltributyl ammonium acetate, etc.

Epoxide resins with which this invention is concerned are the well-known polyepoxides, and hence need not be discussed at length herein. Preferred polyepoxides are glycidyl polyethers having a 1,2-epoxy equivalency greater than one and a weight per epoxide of from 140 to 4000, desirable 2000. Also suitable are epoxyalicyclic esters such as

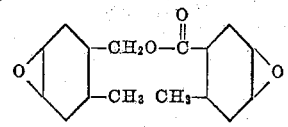

and

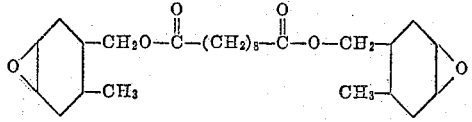

These epoxyalicylic esters are prepared by reacting unsaturated aldehydes with butadiene to form cyclic aldehydes. The cyclic aldehydes can be condensed by the Tischenko reaction to form esters or reduced to form alcohols which can subsequently be reacted with acids to form esters. A desirable ester is prepared by a Diels-Alder reaction of butadiene and crotonaldehyde to form a cyclic unsaturated aldehyde having the formula:

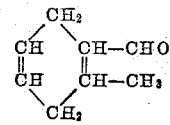

or

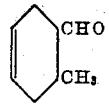

Two mols of this aldehyde are condensed by the Tischenko reaction to form an unsaturated condensate which can then be epoxidized with a peracid to give

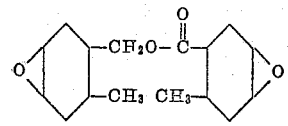

The aldehyde resulting from the reaction of crotonaldehyde and butadiene can also be reduced to the corresponding alcohol and two mols of the alcohol can be reacted with one mol of sebacic acid to give

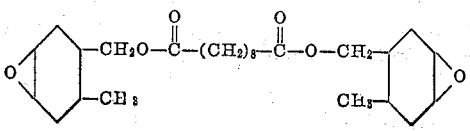

Glycidyl polyethers are made from the reaction of a polyhydric phenol with epihalohydrin or glycerol dihalohydrin and a sufficient amount of caustic alkali to combine with the halogen of the halohydrin. Products resulting from the reaction of a polyhydric phenol with, for example, epichlorhydrin or glycerol dichlorhydrin are monomeric or straight chain polymeric products characterized by the presence of at least two epoxide groups. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)ethane, and 1,5-dihydroxy naphthalene. The preparation of polyepoxides from polyhydric phenols and epihalohydrin is described in U.S. Patents 2,467,171, 2,582,985, 2,538,072, 2,615,007 and 2,698,315, the proportion of the halohydrin (epichlorhydrin or glycerol dichlorhydrin) to dihydric phenol being at least from about 1.2 to 1 to about 10 to 1.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxy butane, 3-bromo-1,2-epoxy hexane, 3-chloro-1,2-epoxy octane, and the like. Another group of glycidyl polyethers is produced by the reaction of a polyhydric alcohol with epichlorhydrin or glycerol dichlorhydrin as disclosed in Zech Patent 2,581,464.

With respect to these polyepoxides, the epoxide equivalent represents the weight of the product which contains and is equivalent to one epoxide group. The epoxide equivalent of epoxy compounds is determined by titrating a one gram sample with an excess of pyridine containing pyridine hydrochloride (made by adding 16 cc. of concentrated hydrochloric acid per liter of pyridine) at the boiling point for twenty minutes and back titrating the excess of pyridine hydrochloride with 0.1 N sodium hydroxide using phenolphthalein as indicator, and considering one HCl as equivalent to one epoxide group.

In carrying out the process of this invention, the polyepoxide is mixed with the quaternary ammonium salt and the mixture is heated at an elevated temperature to effect a cure. Since quaternary ammonium salts are hygroscopic, it is convenient to employ the salt as an aqueous solution. The curing temperature is generally in the range of 90° C. to 200° C., while normal curing temperatures are in the range of 120° C. to 160° C. However, a temperature of somewhat less than 120° C. can be employed when polyepoxides having higher weights per epoxide are employed, because these polyepoxides generally contain a larger number of hydroxyl groups.

The preparation of these compositions can best be understood by reference to certain specific examples. To illustrate effectively the stability of the polyepoxide-quaternary ammonium salt mixtures, gel times are given rather than curing time, the gel being the first stage of an infusible, insoluble material. It is understood that the examples are illustrative only and other variations will occur to those skilled in the art.

The quaternary ammonium salts employed in the examples immediately following, as well as in other examples disclosed, are prepared by the reaction of a quaternary ammonium hydroxide with acetic acid, 2-ethyl hexoic acid, benzoic acid, and formic acid respectively, the quaternary ammonium hydroxide solution in each instance being titrated with an acid to its end point using a pH meter, the resulting salt solution having a pH of 8 to 8.5. In this particular instance, the quaternary ammonium hydroxide employed is a thirty-five percent solution in methanol. Water is added and the quaternary ammonium hydroxide solution is then distilled under vacuum of, say, 20 to 30 mm. at a temperature of 40–50° C. until all of the methanol is removed, leaving an aqueous solution of quaternary ammonium hydroxide which can be titrated with the acid. More specifically, in the case of benzyltrimethyl ammonium formate, 100 parts of distilled water are added to 42 parts of a 35 percent solution in methanol of benzyltrimethyl ammonium hydroxide. The mixture is distilled at 50° C. under vacuum, cooled and 46 parts of distilled water added. The solution is titrated to a pH of 8 with formic acid (11.5 parts of a 90 percent aqueous solution), the resulting product being a 34.6 percent aqueous solution of benzyltrimethyl ammonium formate.

The polyepoxides employed in the following examples and those appearing thereafter are prepared in the manner described in U.S. Patents 2,615,007, 2,615,008 and 2,582,985 by the condensation of varying proportions of epichlorohydrin to bisphenol and subsequent dehydrohalogenation with sodium hydroxide. The table which follows indicates the ratio of epichlorhydrin to bisphenol used to prepare the polyepoxides. In the examples which follow the polyepoxides will be referred to by their epoxide equivalency, e.g., an epoxide with an epoxide equivalent of 460 will be called Resin 460.

| Resin No. | Ratio | | Epoxide equivalent |
|---|---|---|---|
| | Epichlorhydrin | Bisphenol | |
| 190 | 10.0 | 1.0 | 190 |
| 320 | 2.04 | 1.0 | 320 |
| 340 | 2.0 | 1.0 | 340 |
| 270 | 2.6 | 1.0 | 270 |
| 460 | 1.57 | 1.0 | 460 |
| 575 | 1.4 | 1.0 | 575 |
| 950 | 1.21 | 1.0 | 950 |
| 1710 | 100 parts of Resin 950 reacted with 5 parts of bisphenol | | 1,710 |

All parts used in the following examples are by weight.

*Example 1*

In an aluminum dish, a 43 percent aqueous solution of benzyltrimethyl ammonium acetate, prepared as described hereinbefore the examples, is stirred into an epoxide resin or epoxide resin solution and is heated at 150° C. in a circulating oven until a gel results. The following chart indicates the proportions of the components and the resulting gel times. By BTMAAc in the following chart is meant benzyltrimethyl ammonium acetate (43 percent aqueous solution).

| Epoxide Resin No. | Epoxide Resin, parts | BTMAAc, parts | BTMAAc, weight percent | Gel Time at 150° C. |
|---|---|---|---|---|
| 190 | 20.0 | 0.05 | 0.1 | 24 hours plus. |
| 190 | 20.0 | 0.23 | 0.5 | 8 hours. |
| 190 | 20.0 | 0.46 | 1.0 | 25–35 minutes. |
| 190 | 20.0 | 0.92 | 2.0 | 8–9 minutes. |
| 190 | 20.0 | 1.38 | 3.0 | 8 minutes. |
| 190 | 20.0 | 2.1 | 5.0 | 12 minutes. |
| 190 | 20.0 | 4.6 | 10.0 | 14 minutes. |
| 460 [1] | 30.0 | 0.05 | 0.1 | 24 hours plus. |
| 460 [1] | 30.0 | 0.92 | 2.0 | 15 minutes. |
| 460 [1] | 30.0 | 2.1 | 5.0 | Do. |
| 950 [2] | 33.3 | 0.05 | 0.1 | 36 hours plus. |
| 950 [2] | 33.3 | 0.92 | 2.0 | 20 minutes. |
| 950 [2] | 33.3 | 2.1 | 5.0 | 17 minutes. |
| 1710 [3] | 33.3 | 0.05 | 0.1 | 16 hours plus. |
| 1710 [3] | 33.3 | 0.92 | 2.0 | 30 minutes. |
| 1710 [3] | 33.3 | 2.1 | 5.0 | 20 minutes. |

[1] Resin 460 is employed as a 66.7 percent solution in xylene.
[2] Resin 950 is used as a 60 percent solution in a 50/50 mixture of xylene and methyl isobutyl ketone.
[3] Resin 1710 is employed as a 60 percent solution in a 50/50 mixture of xylene and methyl isobutyl ketone.

Example 2

In an aluminum dish, metaphenylene diamine and varying amounts of benzyltrimethyl ammonium acetate (as a 43 percent aqueous solution) are stirred into Epoxide Resin 190 and the mixture is heated in a circulating oven at 125° C. until a gel results. The following chart indicates the proportions of all of the components and the resulting gel times.

| Resin 190 (parts) | MPDA[1] (parts) | BTMAAc[2] (parts) | BTMAAc[2] (weight percent) | Gel Time, minutes |
|---|---|---|---|---|
| 20.0 | 3.0 | 0.0 | 0.0 | 25 |
| 20.0 | 3.0 | 0.05 | 0.1 | 20 |
| 20.0 | 3.0 | 0.92 | 2.0 | 15 |
| 20.0 | 3.0 | 2.1 | 5.0 | 15 |

[1] MPDA—represents metaphenylene diamine.
[2] BTMAAc represents benzyltrimethyl ammonium acetate (43 percent aqueous solution).

Example 3

Into Resin 460 (as a 66.7 percent solution in xylene), is stirred benzyltrimethyl ammonium formate (34.6 percent aqueous solution) prepared as in Example 1, and tetraethylene pentamine. The resulting mixture is poured into an aluminum dish and is heated in a circulating oven at 100° C. until a gel results. The table which follows will indicate the proportions of the components and the time required for gelation.

| Resin 460, Parts | TEPA[1], Parts | BTMAF[2], Parts | BTMAF[2], Weight Percent | Gel Time, minutes |
|---|---|---|---|---|
| 22.5 | 1.0 | 0.0 | 0.0 | 12 |
| 22.5 | 1.0 | 0.92 | 2.0 | 11 |

[1] TEPA represents tetraethylene pentamine.
[2] BTMAF represents benzyltrimethyl ammonium formate (34.6 percent aqueous solution).

As indicated hereinbefore the quaternary ammonium salt-epoxide composition of this invention can also contain amines, anhydrides and polyhydric phenols. The converter of this invention functions as an activator for the epoxide-anhydride, amine and phenol reaction. The amount of anhydride curing agent to be used will vary over a wide range depending upon its structure. In general, good cures are obtained by reacting the anhydride with polyepoxide in a ratio of 0.5 to 1 anhydride equivalent per epoxide equivalent. By anhydride equivalent is meant the weight of the anhydride per anhydride group. The quaternary ammonium salts, on the other hand, are utilized in amounts varying from 0.01 percent to 10 percent by weight of the polyepoxide-anhydride mixture, and more preferably in amounts varying from 0.1 percent to 2 percent by weight of the resin-anhydride mixture. In effecting the cure, in this instance the temperature range will vary somewhat with the particular anhydride and also with the amount of activator used. Excellent rates of cure are obtained at temperatures ranging from about 100° C. to 200° C. or higher.

Any of the known anhydride curing agents are incorporated in the composition in accordance with this aspect of the invention. Dibasic acid anhydrides such as phthalic acid anhydride are very suitable. Dicarboxylic acid anhydrides applicable to this invention include both aliphatic and aromatic dicarboxylic acid anhydrides, either saturated or unsaturated, for example, succinic, adipic, maleic, glutaric, phthalic and sebacic anhydrides, naphthalene dicarboxylic acid anhydrides, etc. Endo-cis-bicyclo-(2,2,1)-5-heptene-2,3-dicarboxylic anhydride (sold under the trade-mark "Nadic" anhydride) and 1,4,5,6,7,7-hexachlorobicyclo-(2,2,1)-5-heptene-2,3-dicarboxylic anhydride (sold under the trademark "Chlorendic" anhydride) are also desirable.

When amines are employed in the epoxide-quaternary ammonium salt composition, while they are all activated, it is preferred to use the quaternary ammonium salt in conjunction with amines which do not give rapid cures. Organic monoamines and polyamines are very suitable. Included are aliphatic, cycloaliphatic, heterocyclic, and aromatic amines containing at least one hydrogen atom attached to the nitrogen atom. Particularly useful are aromatic amines since they do not normally act as rapidly as do aliphatic amines. Also intended are piperidine, metaphenylene diamine, diamino diphenyl methane, p,p'-methylene dianaline, triethylene tetramine, 3-diamino-4-isoprpoyl benzene, tetraethylene pentamine, diaminodiphenyl sulfone, diethylene triamine, ethylene diamine, diethylaminopropylamine, imino bis propylamine, etc.

The amount of amine-type curing agent to be used in curing the polyepoxides is known to vary over a wide range, almost any amount having some effect. Normally not more than 1.5 equivalents of an amine is used per epoxy equivalent. The expression "amine equivalent" refers to the amount of amine curing agent needed to furnish one amino-substituted hydrogen atom. To obtain the best results the amine-type curing agent is employed in about at least one amine equivalent for every epoxy group in the polyepoxide to be involved in the cure. More generally, from 0.2 to 1.5 amine equivalents are used per epoxy group. As in the case of anhydrides, the quaternary ammonium salts are utilized in amounts varying from 0.1 percent to 10 percent by weight of the resin, i.e., resin containing both polyepoxides and amine curing agents, and more preferably in amounts varying from 0.1 percent to 2 percent by weight of the resin. In effecting the cure, almost any desired curing temperature can be employed. Excellent rates of cure are obtained at temperatures ranging from about 40° to 200° C. and these are the preferred temperatures to be used. Temperature much above 200° C. are generally not desirable, but may be employed if necessary.

When polyhydric phenols are employed in conjunction with the epoxide resins and quaternary ammonium salts of this invention, the polyhydric phenols employed are mono- or polynuclear phenols having two or more phenolic hydroxyl groups linked to separate nuclear aromatic carbon atoms. Among suitable compounds of this class are mononuclear phenols, for example, resorcinol, catechol, orcinol, xylorcinol, apionol, etc., as well as polynuclear phenols such as bis(4-hydroxyphenyl)-2,2-propane (bisphenol), 4,4'-dihydroxy benzophenone, bis(4-hydroxyphenyl)-1,1-ethane, bis(4-hydroxyphenyl)-1,1 - isobutane, bis(4-hydroxyphenyl)-2,2-butane, bis(4-hydroxy-2-methyl phenyl)-2,2-propane, bis(4-hydroxy-2-tert-butyl phenyl)-2,2-propane, bis(2-hydroxynaphthyl)-methane, 1,3-dihydroxynaphthalene, 1,2,5,6-tetrahydroxynaphthalene, etc. The polyhydric phenols well suited for use in the invention are of the formula $R(OH)_n$, wherein $n$ is an integer of 2 to 4, each hydroxyl group being linked directly to a different nuclear carbon atom of R which is an aromatic hydrocarbon radical.

One class of polyhydric phenols particularly useful as curing agents is the group of compounds containing more than two phenolic hydroxyl groups per mol. Examples of compounds of this type are phloroglucinol, pyrogallol, 1,2,4-trihydroxybenzene, 6-methyl-1,2,4-trihydroxybenzene, and other trihydric phenols such as phenol-aldehyde condensates. Desirable phenol-aldehyde condensates are commercial thermoplastic resins made from phenols or alkyl phenols and formaldehyde and having more than two phenolic hydroxyls per mol, say, two to twelve.

Another class of polyhydric phenols useful as curing agents is the diphenols. By diphenol is meant (a) a polynuclear phenol having two phenolic hydroxyl groups as it sole reactive groups such as dihydroxydiphenylmethanes, their isomers, their homologs, and their substituted compounds and (b) a benzene ring having two hydroxyls such as resorcinol, and the like. Included in addition to resorcinol are other dihydric phenols, for example, hydroquinone and catechol. Examples of such compounds are 4,4'-diphenols made by the condensation of phenols with aldehydes and dihydroxydiphenylmethane, dihydroxydiphenylmethylmethane, dihydroxydiphenyldimethylmethane, dihydroxydiphenylethylmethane, dihydroxydiphenyldiethylmethane, dihydroxydiphenylmethylpropylmethane, and dihydroxydiphenylethylphenylmethane. Also important are compounds containing two benzene nuclei linked to each other directly or through other atoms or atom groups, for example, —(CH$_2$)$_n$—, —SO$_2$—, —O—, —CO— and —CR$_2$—, and having two phenolic hydroxyl groups as their sole reactive groups.

The amount of phenol to be mixed with the epoxide resin and quaternary ammonium salt depends on many factors such as the type of polyhydric phenol and the epoxide content of the polyepoxide. Good cures are obtained by reacting the polyepoxide with one or more phenolic hydroxyls per epoxide group of polyhydric phenol and from 0.1 percent to 10 percent by weight of the polyepoxide-phenol mixture of the quaternary ammonium salt. Generally from 0.1 to 1 phenol equivalent (weight per phenolic hydroxyl) is employed per epoxide group (one epoxy equivalent), the quaternary ammonium salts being utilized in amounts of from 0.1 to 10 percent by weight of the resin, i.e., a resin containing both polyepoxide and polyhydric phenol. However, in the case of polyfunctional phenols such as phenol formaldehyde condensates, tri- and tetra-hydric phenols, etc., cross-linking can be obtained with a ratio of greater than one phenolic hydroxyl per epoxy equivalent.

By proper selection of phenol and by proper adjustment of the amount of activator virtually any desired curing temperature can be employed. Excellent rates of cure are obtained at temperatures ranging from about 100° C. to 200° C. or higher.

The invention can best be further illustrated by reference to additional specific examples. However, it is to be understood that the examples are for the purposes of illustration only and are not to be construed as limiting the invention in any of its broader aspects. The effect of quaternary ammonium salts of organic acids on curing schedules of known epoxide curing agents is measured by preparing castings of epoxide resins. The curing agent with, and without, the quaternary ammonium salt is combined with the epoxide resin, the mixture is heated in an aluminum cup and gel times are determined. A fast gel time indicates a rapid cure.

*Example 4*

To prepare a resin solution with a viscosity suitable for film formation (60 percent solids content), 20.0 parts of Resin 340 (employed as a 75 percent solution in xylene) are thinned with an additional 3.0 parts of xylene and as a leveling agent, 0.7 parts of a butylated urea-formaldehyde resin [having a viscosity of S to V (Gardner-Holdt), a solids content of 60 percent (in 87½ percent butanol and 12½ percent xylene) and a naphtha tolerance of 350] is added. Into this solution is mixed 0.12 part of a 45 percent aqueous choline acetate solution prepared, as described previously, from 242.0 parts (one mol) of a 50 percent aqueous solution of choline by titrating to a pH of 7 with 64.0 parts (1.07 mol) of glacial acetic acid. From the resulting solution, a three mil film is drawn down on a glass plate and is baked at 150° C. for thirty minutes to obtain a film exhibiting excellent toughnesss, and flexibility, excellent mar resistance and adhesion.

*Example 5*

A resinous solution with a viscosity suitable for film formation is prepared by thinning 20.0 parts of Resin 460 (as an 80 percent solution in xylene) with an additional 3.0 parts of xylene and 5.0 parts of 2-ethoxy ethanol. As a leveling agent, 0.7 part of the butylated urea-formaldehyde resin described in Example 4 is added. To this solution is added 0.12 part of the 45 percent aqueous choline acetate solution prepared in Example 4 and a 3 mil film is drawn down on a glass plate and is baked at 150° C. for thirty minutes. The resulting cured film possesses excellent hardness, flexibility and mar resistance.

An epoxide stability test is run on a portion of the resinous blend of this example, by determining the epoxide equivalent of the solution immediately after preparation and after standing for 22 days at room temperature. The epoxide equivalent of the solution is determined by titrating a one gram sample with an excess of pyridine containing pyridine hydrochloride (made by adding 16 cc. of concentrated hydrochloric acid per liter of pyridine) at the boiling point for twenty minutes and back titrating the excess pyridine hydrochloride with 0.1 N sodium hydroxide using phenolphthalein as indicator, and considering that one HCl is equivalent to one epoxide group. In this case the epoxide equivalent of the solution containing catalyst originally is 880 and after standing for 22 days the epoxide equivalent has risen only to 990.

*Example 6*

A resin solution with a viscosity suitable for the formation of films is prepared by thinning 20.0 parts of Resin 320 (employed as a 75 percent solution in xylene) with 5.0 parts of 2-ethoxy ethanol and 3.0 parts of xylene. To this solution is added as a leveling agent 0.7 part of the butylated urea-formaldehyde resin described in Example 4. Into this solution is mixed 0.12 part of the 45 percent aqueous solution of choline acetate (prepared in Example 4) and a 3 mil film is drawn down on a glass plate and is cured by baking for 30 minutes in a 150° C. oven. The cured film has excellent toughness, flexibility, mar resistance and adhesion and exhibits no evidence of crawling or cratering.

The epoxide stability of the blend of the preceding paragraph is measured as in Example 5 by determining the epoxide equivalent of the solution. On preparation, the epoxide equivalent of the solution containing catalyst is 760; after standing for 22 days at room temperature the epoxide equivalent has increased to only 878.

*Example 7*

In a suitable container, a resinous solution with a viscosity suitable for film formation is prepared by thinning 21.4 parts of Resin 575 (employed as a 70 percent solution in a 50/50 mixture of xylene and methyl isobutyl ketone) with 7.9 parts of 2-ethoxy ethanol. As a leveling agent, 0.7 part of the butylated urea-formaldehyde resin described in Example 4 is added. Into this solution is mixed 0.4 part of the 45 percent aqueous solution of choline acetate described in Example 4 and from the resulting solution a film is drawn down on a glass plate with a 3 mil blade and is baked at 150° C. for thirty minutes. The resulting cured film exhibits excellent flexibility, adhesion and mar resistance.

*Example 8*

A resinous solution with a viscosity suitable for film formation is prepared by thinning 25.0 parts of Resin 950 (employed as a 60 percent solution in a 50/50 mixture of xylene and methyl isobutyl ketone) with 5.0 parts of 2-ethoxy ethanol. As a leveling agent, 0.7 part of the butylated urea-formaldehyde resin described in Example 4 is added to the mixture. Into this solution is blended 0.32 part of the 45 percent aqueous solution of choline acetate of Example 4 and a 2 mil film of the resulting solution is drawn down on a glass plate and is baked at 150° C. for 30 minutes, resulting in a film possessing excellent flexibility and mar resistance, and good adhesion.

*Example 9*

To prepare a resinous solution with a viscosity suitable for film formation, 20.0 parts of Resin 340 (employed as a 75 percent solution in xylene) are thinned with an additional 3.0 parts of xylene and to this mixture is added, as a leveling agent, 0.6 part of the butylated urea-formaldehyde resin described in Example 4. Into this solution is mixed 0.2 part of benzyltrimethyl ammonium acetate (as a 43 percent aqueous solution) and from the resulting solution a film is drawn down on a glass plate with a 3 mil blade and is baked for thirty minutes at 150° C. The cured film obtained is extremely tough and flexible, has good mar resistance and exceptional adhesion.

Example 10

In an aluminum dish, piperidine and benzyltrimethyl ammonium 2-ethyl hexoate (as a 55 percent aqueous solution) prepared as in Example 1, are stirred into a 66.7 percent solution of Resin 460 in xylene. The mixture is heated in a 125° C. oven until gellation results. The following table indicates the composition of some mixtures and the time necessary for gellation.

| Resin 460, Parts | Piperidine, Parts | BTMAH,[1] Parts | BTMAH,[1] Weight Percent | Gel Time, minutes |
|---|---|---|---|---|
| 30.0 | 1.0 | 0.0 | 0.0 | 165 |
| 30.0 | 1.0 | 0.05 | 0.1 | 115 |
| 30.0 | 1.0 | 0.92 | 2.0 | 34 |
| 30.0 | 1.0 | 2.1 | 5.0 | 27 |

[1] BTMAH represents benzyltrimethyl ammonium-2-ethyl hexoate (55 percent aqueous solution).

Example 11

In a 400 ml. beaker, 100.0 parts of Resin 190 and 39.0 parts of phthalic anhydride are heated to 110–120° C. with stirring, until all of the phthalic anhydride is melted. Portions (27.8 parts) of the solution are combined with varying amounts of benzyltrimethyl ammonium acetate (43 percent aqueous solution), are poured into aluminum dishes and are heated in a 125° C. circulating oven until gels are obtained. In the following table, the amounts of accelerator used and the resulting gel times are given.

| Resin 190, Parts | Phthalic Anhydride Parts | BTMAAc,[1] Parts | BTMAAc,[1] Weight Percent | Gel Time |
|---|---|---|---|---|
| 20.0 | 7.8 | 0.0 | 0.0 | 24 hrs. plus. |
| 20.0 | 7.8 | 0.05 | 0.1 | 66 minutes. |
| 20.0 | 7.8 | 0.92 | 2.0 | 16 minutes. |
| 20.0 | 7.8 | 2.1 | 5.0 | 6 minutes. |

[1] BTMAAc represents benzyltrimethyl ammonium acetate (43 percent aqueous solution).

Example 12

Into four aluminum dishes are weighed 20.0 parts of Resin 270 and 3.6 parts of maleic anhydride. The dishes are placed in a 100° C. oven until all of the maleic anhydride is melted, at which time varying proportions of a 43 percent aqueous solution of benzyltrimethyl ammonium acetate (prepared in Example 1) are stirred into the melts and the mixtures are heated in a 125° C. circulating oven until gels are obtained. In the table which follows, the amounts of accelerator used and the resulting gel times are indicated.

| Resin 270, Parts | Maleic Anhydride, Parts | BTMAAc,[1] Parts | BTMAAc,[1] Weight Percent | Gel Time, minutes |
|---|---|---|---|---|
| 20.0 | 3.6 | 0.0 | 0.0 | 180 |
| 20.0 | 3.6 | 0.05 | 0.1 | 45 |
| 20.0 | 3.6 | 0.92 | 2.0 | 18 |
| 20.0 | 3.6 | 2.1 | 5.0 | 10 |

[1] BTMAAc represents benzyltrimethyl ammonium acetate (43 percent aqueous solution).

Example 13

In a 400 ml. beaker, 100.0 parts of Resin 190 and 33.5 parts of Bisphenol A are combined and the beaker contents are heated on a hot plate, with stirring, until all of the Bisphenol A is melted. Portions (26.7 parts) of this solution are poured into aluminum dishes, and varying amounts of benzyltrimethyl ammonium acetate (43 percent aqueous solution) prepared in Example 1 are added. The dishes are placed in a 125° C. circulating oven until gels result. In the table which follows, the amounts of the components used and the observed gel times are indicated.

| Resin 190, Parts | Bisphenol A, Parts | BTMAAc,[1] Parts | BTMAAc,[1] Weight Percent | Gel Time |
|---|---|---|---|---|
| 20.0 | 6.7 | 0.0 | 0.0 | 35 hrs. plus. |
| 20.0 | 6.7 | 0.05 | 0.1 | 255 minutes. |
| 20.0 | 6.7 | 0.92 | 2.0 | 14 minutes. |
| 20.0 | 6.7 | 2.1 | 5.0 | 13 minutes. |

[1] BTMAAc represents benzyltrimethyl ammonium acetate (43 percent aqueous solution).

Example 14

Into a 400 ml. beaker are weighed 33.0 parts of a non-heat reactive high molecular weight phenol-formaldehyde condensate, with a hydroxyl equivalent of 153, and 100.0 parts of Resin 460. The beaker contents are heated on a hot plate, adding 2-ethoxy ethanol acetate, if necessary, to reduce the viscosity to a point at which the resulting solution may be readily stirred at 75–90° C. In this case, 42.5 parts of 2-ethoxy ethanol acetate are added. Portions (35.1 parts) of the resulting solution are weighed into aluminum dishes, benzyltrimethyl ammonium acetate (43 percent aqueous solution) is added in varying amounts, and the mixtures are heated in a circulating oven at 125° C. until gels result. In the following table the amounts of the components and the corresponding gel times are presented.

| Resin 460, Parts | Phenol-Formaldehyde Resin, Parts | 2-Ethoxy Ethanol Acetate, Parts | BTMAAc,[1] Parts | BTMAAc,[1] Weight Percent | Gel Time |
|---|---|---|---|---|---|
| 20.0 | 6.6 | 8.5 | 0.0 | 0.0 | 30 hours plus. |
| 20.0 | 6.6 | 8.5 | 0.05 | 0.1 | 13 hours plus. |
| 20.0 | 6.6 | 8.5 | 0.92 | 2.0 | 125 minutes. |
| 20.0 | 6.6 | 8.5 | 2.1 | 5.0 | 70 minutes. |

[1] BTMAAc represents benzyltrimethyl ammonium acetate (43 percent aqueous solution).

Example 15

In a suitable container, 80.0 parts of Resin 190 and 10.0 parts of finely ground diamino diphenyl sulfone are mixed together. Portions (22.5 parts) of this grind are weighed into four aluminum dishes. To each dish is added in varying amounts benzyltrimethyl ammonium acetate (43 percent aqueous solution) as prepared in Example 1, and the contents are well mixed. The aluminum dishes are placed in a 100° C. circulating oven until gellation results. In the table which follows, the proportions of the components employed and corresponding gel times are given.

| Resin 190, Parts | Sulfone,[1] Parts | BTMAAc,[2] Parts | BTMAAc,[2] Wt. Percent | Gel Time |
|---|---|---|---|---|
| 20.0 | 2.5 | 0.0 | 0.0 | 4 hours plus. |
| 20.0 | 2.5 | 0.05 | 0.1 | 210 minutes. |
| 20.0 | 2.5 | 0.92 | 2.0 | 85 minutes. |
| 20.0 | 2.5 | 2.1 | 5.0 | 75 minutes. |

[1] Sulfone represents diamino diphenyl sulfone.
[2] BTMAAc represents benzyltrimethyl ammonium acetate (43 percent solution).

Example 16

Into each of four aluminum dishes are weighed 20.0 parts of Resin 190. Into these portions of resin are blended, with agitation, varying amounts of the accelerator benzyltrimethyl ammonium benzoate as a 55 percent aqueous solution (prepared as in Example 1) and the mixtures are heated in a 150° C. oven until gels are obtained. The table which follows indicates the amounts of accelerator employed and the corresponding gel time observed.

| Resin 190, Parts | BTMAB,[1] Parts | BTMAB,[1] Wt. Percent | Gel Time |
| --- | --- | --- | --- |
| 20.0 | 0.04 | 0.1 | >21 hours. |
| 20.0 | 0.18 | 0.5 | Do. |
| 20.0 | 0.36 | 1.0 | 2 hours. |
| 20.0 | 0.73 | 2.0 | 13 minutes. |
| 20.0 | 1.82 | 5.0 | 8 minutes. |

[1] BTMAB represents benzyltrimethyl ammonium benzoate (55 percent aqueous solution).

What is claimed is:

1. A heat curable composition comprising an epoxide resin of the group consisting of glycidyl polyethers of polyhydric phenols, glycidyl polyethers of polyhydric alcohols and epoxy alicyclic esters, said epoxide resins having a 1,2-epoxy equivalency greater than one and an epoxide equivalent of from 140 to 4000, and from 0.1 to 10 percent of a quaternary ammonium salt selected from the group consisting of tetraalkyl, aryl trialkyl, and alkaryl trialkyl ammonium salts of organic acids having pK values of 1 to 5 wherein the aryl, alkaryl and alkyl substituents each have no more than eight carbon atoms, considering an epoxide equivalent as the weight of the epoxide resin in grams per epoxide group.

2. The composition of claim 1 wherein the epoxide resin is the glycidyl polyether of a polyhydric phenol having a weight per epoxide of 150 to 1000 and wherein the quaternary ammonium salt is benzyltrimethyl ammonium acetate.

3. The composition of claim 1 which includes a dicarboxylic acid anhydride in an amount of 0.5 to 1 anhydride equivalent per epoxide equivalent, considering an anhydride equivalent as the weight in grams of anhydride per anhydride group.

4. The composition of claim 1 which includes from 0.1 to 1 equivalent per epoxide equivalent of a polyhydric phenol considering an equivalent phenol as the weight in grams of phenol per phenolic hydroxyl group.

5. A process for the preparation of thermoset resins which comprises heat reacting (1) an epoxide resin of the group consisting of glycidyl polyethers of polyhydric phenols, glycidyl polyethers of polyhydric alcohols and epoxy alicyclic esters, said epoxide resins each having a 1,2-epoxy equivalency greater than one and an epoxide equivalent of 140 to 4000 with (2) from 0.1 to 10 percent based on the epoxide resin of a quaternary ammonium salt selected from the group consisting of tetraalkyl, aryl trialkyl, and alkaryl trialkyl ammonium salts of organic acids having pK values of 1 to 5 wherein the aryl, alkaryl and alkyl substituents each have no more than eight carbon atoms, considering an epoxide equivalent as the weight of epoxide resin in grams per epoxide group.

6. The process of claim 5 wherein the polyepoxide is a glycidyl polyether of a polyhydric phenol having a weight per epoxide not exceeding 2000 and wherein the quaternary ammonium salt is the salt of an organic acid having a pK value of one to five.

7. The process of claim 6 wherein the glycidyl polyether is in admixture with from 0.5 to 1 equivalent per epoxide equivalent of a dicarboxylic acid anhydride, considering an anhydride equivalent as the weight in grams of anhydride per-anhydride group.

8. The process of claim 6 wherein the glycidyl polyether is in admixture with from 0.2 to 1.5 equivalents per epoxide equivalent of an amine containing at least one hydrogen atom attached to the nitrogen atom, considering an amine equivalent as the weight of amine in grams per amino-substituted hydrogen atom.

9. The process of claim 6 wherein the glycidyl polyether is in admixture with 0.1 to 1 equivalent per epoxide equivalent of a polyhydric phenol, considering an equivalent phenol as the weight in grams of phenol per phenolic hydroxyl group.

10. The infusible, insoluble composition of claim 6.

References Cited in the file of this patent

UNITED STATES PATENTS

| | | |
| --- | --- | --- |
| 2,531,440 | Jordan | Nov. 28, 1950 |
| 2,606,810 | Erickson et al. | Aug. 12, 1952 |
| 2,768,992 | Zukas | Oct. 30, 1956 |

OTHER REFERENCES

Polymer Processes (Schildknecht), publ. by Interscience, New York, 1956, page 443.